United States Patent

Brower

[11] 4,174,917
[45] Nov. 20, 1979

[54] DOWELING GUIDE

[76] Inventor: Conrad J. Brower, 4313 NW. 14, Oklahoma City, Okla. 73107

[21] Appl. No.: 924,123

[22] Filed: Jul. 13, 1978

[51] Int. Cl.² ............................................. B23Q 5/22
[52] U.S. Cl. ....................................... 408/62; 408/69; 408/72 R; 408/20; 144/92; 269/58
[58] Field of Search .................. 408/62, 64, 69, 70, 408/72 R, 110, 115 R, 20; 269/58; 144/92

[56] References Cited
U.S. PATENT DOCUMENTS

| | | | |
|---|---|---|---|
| 1,556,540 | 10/1925 | Patterson | 144/92 |
| 1,937,147 | 11/1933 | Hall | 408/62 |
| 1,982,025 | 11/1934 | Russell | 408/62 |
| 2,811,182 | 10/1957 | Beale et al. | 408/20 |
| 2,852,050 | 9/1958 | Horstmann et al. | 144/92 |
| 2,928,441 | 3/1960 | Farrow | 144/92 |

Primary Examiner—Leonidas Vlachos
Attorney, Agent, or Firm—Robert K. Rhea

[57] ABSTRACT

A workpiece supporting doweling guide for use in combination with a radial arm saw having a drill bit operated by the saw motor. The guide includes a flat base overlying the saw platform at one side of the radial arm. An intermediate plate and a workpiece support plate overlie the base in superposed spaced relation. Tracks are interposed between the base and intermediate plate and between the workpiece support plate for reciprocating the intermediate and workpiece support plates as a unit toward and away from the drill bit and for lateral movement of the workpiece support plate relative to the intermediate plate. Adjustable stops between the respective plates limit movement of the intermediate and workpiece plates to predetermined dimensions.

3 Claims, 5 Drawing Figures

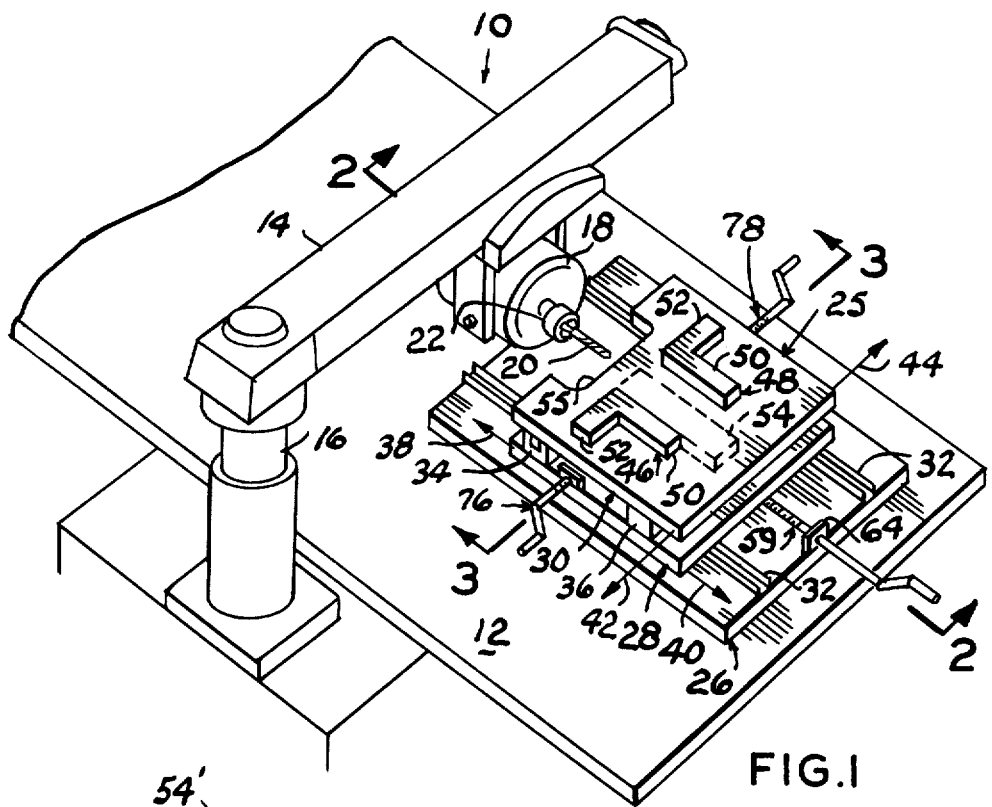

DOWELING GUIDE

BACKGROUND OF THE INVENTION

1. Field of the invention

The present invention relates to wood working tools and more particularly to a workpiece supporting apparatus for drilling doweling holes therein.

When making articles from wood, such as chests or articles of furniture, it is usually desirable to join the components thereof by using wooden dowels to form a finished rigid joint. To form a satisfactory dowel joint it is necessary that the dowel receiving holes, formed in abutting pieces, be in coaxial alignment so that the mating edges of the pieces forming the joint will be in accurate alignment.

This invention simplifies the accurate drilling of dowel holes to form such joints.

2. Description of the prior art

Dowel forming apparatus, as shown by the prior art, has generally comprised apparatus arranged for connection with the frame or ways of a lathe, or the like, such as disclosed by U.S. Pat. Nos. 105,188 and 3,045,727 in which the work holding guide moves the workpiece toward the chuck supported drill bit of the lathe. Another example of a doweling guide is disclosed by U.S. Pat. No. 2,794,463 comprising an open framework adapted for connection with a saw table, or the like, which includes clamp means for holding the workpiece and positioning a portable hand drill on the framework so that the workpiece may be moved toward and away from the drill bit.

This invention is distinctive over the prior art by providing a dowel guide or workpiece holding jig which flatly overlies the work table or platform of a radial arm saw and includes longitudinal and transverse moving of the workpiece with respect to the position of the drill bit with the dimension, such as movement, being predetermined and controlled by adjustable stops forming a part of the guide so that a plurality of dowel holes may be drilled in a plurality of workpieces with the spacing, depth and alignment of the holes being accurately aligned axially for subsequent reception of dowel pins.

SUMMARY OF THE INVENTION

A flat base is mounted on the work table or platform at one side of the arm of a conventional radial arm saw having a drill bit connected with the threaded end of the saw motor shaft. An intermediate plate overlies the base plate and is movable toward and away from the drill bit by cooperating tracks interposed in parallel spaced-apart relation between the base and intermediate plates. A workpiece supporting plate overlies the intermediate plate and is movable transversely of the intermediate plate by a tongue and groove slide interposed therebetween. Workpiece guideways, overlying and secured to the workpiece plate, align a workpiece with the drill bit axis.

Screw threaded rods, interposed between the respective plates, adjustably position stops which limit movement of the intermediate plate toward and away from the drill bit and the workpiece supporting plate transversely of the drill bit axis.

The principal object of this invention is to provide a compact, easily assembled, manually operated doweling workpiece guide for use in combination with a radial arm saw for accurately drilling a plurality of dowel holes in a plurality of workpieces.

BRIEF DESCRIPTION OF THE DRAWINGS

FIG. 1 is a fragmentary perspective view of the apparatus in operative position when mounted on the work table of a conventional radial arm saw and illustrating, by dotted lines, the relative position of a workpiece;

FIGS. 2 and 3 are fragmentary vertical cross sectional views, to a larger scale, taken substantially along the line 2—2 and 3—3 of FIG. 1;

FIG. 4 is a fragmentary vertical cross sectional view, to a further enlarged scale, taken substantially along the line 4—4 of FIG. 2; and, FIG. 5 is a fragmentary cross sectional view, to a different scale, illustrating a dowel joint of wooden members formed by using the apparatus.

DESCRIPTION OF THE PREFERRED EMBODIMENT

Like characters of reference designate like parts in those figures of the drawings in which they occur.

In the drawings:

The reference numeral 10 indicates a conventional radial arm saw having its arm 14 supported by a vertically adjustable standard 16 at one side of a platform work table 12. The saw 10 further includes a saw motor 18 having a drill bit 20 connected by a chuck 22 with the threaded accessory mounting end of the motor drive shaft. The above description is conventional with radial arm saws and is set forth to show the combination with which the doweling guide is used.

The numeral 25 indicates the doweling guide, as a whole, which is rectangular flat-like in overall configuration. The doweling guide 25 comprises a base plate 26, an intermediate plate 28 and a top or workpiece support plate 30 arranged in superposed parallel spaced relation. The base plate 26 is rectangular elongated and flatly overlies the saw platform 12 at one side of the radial arm 14 with its longitudinal axis aligned in parallel spaced relation with respect to the axis of the drill bit 20. The desired position of the drill bit is maintained by locking the position of the motor on the arm 14 and by the vertically adjusted locked position of the standard 16. The base plate 26 may be secured to the platform 12, as by C-clamps or screws, neither of which are shown, to maintain its position fixed relative to the drill bit. The intermediate plate 28, which may be of equal width but is preferably of shorter length than the base 26, is generally centrally disposed in parallel overlying relation with respect to the base 25.

A pair of cooperating tracks 32, such as conventional cabinet drawer glides, are longitudinally interposed in parallel spaced relation between the base 26 and intermediate plate 28 and respectively connected with the base and intermediate plate for forward and rearward movement of the intermediate plate toward and away from the drill bit 20. The top or workpiece supporting plate 30, which is of substantially equal overall dimension with respect to the intermediate plate, is disposed in flat overlying parallel spaced relation with respect to the intermediate plate.

A tongue and groove slide 34 is transversely interposed between the intermediate plate 28 and top plate 30 adjacent their edges nearest the drill bit 20 with the groove portion secured to the upper surface of the intermediate plate and its tongue portion secured to the depending surface of the top plate thus permitting transverse sliding movement of the top plate in either lateral direction with respect to the intermediate plate and axis of the drill bit 20. The other or rearward end portions of the intermediate and top plates are maintained in parallel spaced relation by a spacer 36 transversely overlying and secured to the upper surface of the intermediate plate 28.

Thus, it may be seen that the intermediate and top plates may be moved as a unit longitudinally of the base 26 toward and away from the drill bit, in the direction of the arrows 38 and 40, by means of the tracks 32. Similarly, the top plate 30 may be moved transversely of the intermediate and base plates, in the direction of the arrows 42 and 44, by the sliding action of the tongue and groove slide 34 and spacer 36.

The top plate is provided with guideways 46 and 48 comprising substantially L-shaped members with the leg portions 50 of the L-shaped guideways arranged in parallel spaced relation in a forward and rearward direction and the foot portions 52 of the L-shaped guideways arranged in opposed laterally directed alignment normal to the axis of the drill bit 20. In the example shown, a workpiece 54 is longitudinally disposed between the legs 50 of the guideways in edge to edge contact with one of the legs 50 and in horizontal alignment with the axis of the drill bit 20 for drilling a dowel hole in the end surface of the workpiece. The workpiece 54 may be manually held in position adjacent the guideway leg or clamped thereto, as by a C-clamp, not shown. A first dowel hole 56 is drilled in the end of the workpiece 54 by moving the top and intermediate plates as a unit toward the drill bit. The forward end surface of the top plate 30 is provided with a recess 55 to accommodate the drill chuck 22 and adjacent end portion of the motor 18 during the drilling action. The depth of the hole 56 is determined by the length of the dowel 58 to be placed therein and thus, when predetermined, this measurement is transferred to a dowel hole depth control means 59.

The control means 59 comprises a threaded member, such as a nut 60 threadedly received by an elongated screw threaded rod 62 journalled, intermediate its ends, by a first base ear 64 centrally secured to the rearward end of the base 26 and journalled at its forward end by a second base ear 66 secured to the upper surface of the base 26 forwardly of the nut 60. Rotation of the nut 60 with the rod 62 is prevented by sliding contact of opposite flats of the nut with the depending surface of the intermediate plate 28 and upper surface of the base 26, respectively. An intermediate plate apertured stop prong 68, partially surrounding the screw rod 62, is secured to the depending surface of the intermediate plate between the nut 60 and first base ear 64. The position of the nut 60 is adjusted longitudinally of the screw rod 62 by manually rotating the rod by a handle 70 secured to its rearward end so that the spacing between the nut 60 and the stop prong 68 equals the depth of the hole 56 to be drilled. When the intermediate and top plates are manually moved, as a unit, toward the drill bit, drilling action on the workpiece is stopped when the lug 68 contacts the nut 60.

Lateral movement of the top plate 30, with respect to the intermediate plate for drilling a second dowel hole 72 in the workpiece 54, for receiving a second dowel pin 74, is predetermined and controlled by similar top plate movement control means 76 and 78. The top plate movement control means 76 and 78 are mirror images of each other and, in the interest of brevity, only the control means 76 is described in detail.

The control means 76 comprises a nut 80 similarly threadedly surrounding a threaded shaft 82 transversely interposed centrally between the intermediate and top plates normal to the threaded rod 62 and journalled at its inwardly disposed end by an end lug 84 secured to the upper surface of the intermediate plate and intermediate its ends by an outer lug 86 secured to the intermediate plate adjacent its lateral limit. The screw rod 82 is manually rotated by a handle 88 for moving the nut 80 toward and away from a stop projection 90 partially surrounding the rod 82 and rigidly secured to the depending surface of the top plate 30 between the nut 80 and outer lug 86. Thus, as illustrated in FIG. 3, the nut 80 is disposed adjacent the projection 90 and prevents movement of the top plate 30 to the right, as viewed in FIG. 3, so that the top plate is in position for drilling the first dowel hole 56. The nut 80 of the stop means 78 is positioned in spaced relation with respect to its associated stop projection 90 a distance equal to the spacing between the axes of the dowel pin holes 56 and 72 so that after drilling the first dowel pin hole 56 the top plate 30 is manually shifted to the left, as viewed in FIGS. 1 and 3, and the intermediate and top plate are moved, as a unit, toward the drill bit 20 for drilling the second dowel hole 72 without moving the workpiece 54 relative to the guideways 46 and 48. This action is repeated for each and every workpiece in which dowel pin holes are to be longitudinally drilled in the ends thereof.

The cooperating holes formed in the companion workpiece 54' are formed by positioning one longitudinal edge of the workpiece 54' in contact with the forwardly disposed surfaces of the guideway foot portions 52. The intermediate and top plates are then moved toward and away from and laterally of the drill bit in an identical manner with the same measurement settings of the respective dowel hole depth and spacing control means 59, 76 and 78.

The apparatus 25 may be used with substantially any fixed position motor having a horizontal shaft driving a drill bit with its axis parallel with the surface of a platform or table supporting the motor.

Obviously the invention is susceptible to changes or alterations without defeating its practicability. Therefore, I do not wish to be confined to the preferred embodiment shown in the drawings and described herein.

I claim:

1. A doweling guide in combination with a radial arm saw having an arm portion projecting horizontally in vertically spaced transverse relation across a work platform intermediate its ends and having a drill bit operatively attached to the radial arm saw motor and projecting horizontally in parallel spaced relation toward one end of the platform, the improvement comprising:

an elongated base plate flatly overlying said platform and having a forward end portion underlying the position of said drill bit;

an intermediate plate overlying said base plate in longitudinally aligned vertically spaced parallel relation;

a top plate overlying said intermediate plate in vertically spaced parallel relation;

top plate support and control means interposed between and secured to said top plate and said intermediate plate for movement of said top plate transversely of said intermediate plate;

intermediate plate support and control means interposed between and secured to said intermediate plate and said base plate for movement of said intermediate plate and said top plate as a unit longitudinally of said base plate toward and away from said drill bit; and, guideways overlying and secured to said top plate for alignably positioning a workpiece with the axis of said drill bit.

2. The combination according to claim 1 in which said intermediate plate support and control means includes:

a pair of cooperating tracks extending longitudinally of said base plate in parallel spaced relation;

an elongated threaded rod extending longitudinally of said base between said tracks;

base supported ears journalling said rod;

a first threaded member surrounding said rod intermediate its ends and being movable toward the respective end of said rod by angular rotation of said rod; and, a stop prong depending from said intermediate plate and intersecting said first threaded member when said intermediate plate is moved a predetermined distance toward the forward end of said base plate.

3. The combination according to claim 2 in which said top plate support and control means includes:

cooperating sliding members extending transversely of said intermediate plate and said top plate;

at least one elongated threaded shaft extending transversely of said intermediate plate normal to the longitudinal axis of said base;

intermediate plate lugs journalling said shaft;

a second threaded member surrounding said shaft intermediate its ends and being movable toward the respective end of said shaft by angular rotation of said shaft; and, a projection depending from said top plate and intersecting said second threaded member when said top plate is moved a predetermined distance transversely of said intermediate plate.

* * * * *